US010567374B2

(12) United States Patent
Liu

(10) Patent No.: US 10,567,374 B2
(45) Date of Patent: Feb. 18, 2020

(54) INFORMATION PROCESSING METHOD AND SERVER

(71) Applicant: Tencent Technology (Shenzhen) Company Limited, Shenzhen (CN)

(72) Inventor: Jie Liu, Shenzhen (CN)

(73) Assignee: Tencent Technology (Shenzhen) Company Limited, Shenzhen (CN)

( * ) Notice: Subject to any disclaimer, the term of this patent is extended or adjusted under 35 U.S.C. 154(b) by 54 days.

(21) Appl. No.: 15/976,451

(22) Filed: May 10, 2018

(65) Prior Publication Data

US 2018/0262482 A1 Sep. 13, 2018

Related U.S. Application Data

(63) Continuation of application No. PCT/CN2017/083050, filed on May 4, 2017.

(30) Foreign Application Priority Data

May 5, 2016 (CN) .......................... 2016 1 0293474

(51) Int. Cl.
*H04L 29/06* (2006.01)
*G06N 20/00* (2019.01)
*G06N 7/00* (2006.01)

(52) U.S. Cl.
CPC ........... *H04L 63/083* (2013.01); *G06N 7/005* (2013.01); *G06N 20/00* (2019.01)

(58) Field of Classification Search
CPC .................................................. H04L 63/083
See application file for complete search history.

(56) References Cited

U.S. PATENT DOCUMENTS

2008/0155564 A1* 6/2008 Shcherbina ............ G06Q 10/04
719/318
2009/0089876 A1 4/2009 Finamore et al.
(Continued)

FOREIGN PATENT DOCUMENTS

CN 103118043 A 5/2013
CN 103179098 A 6/2013
(Continued)

OTHER PUBLICATIONS

Chinese Office Action dated Aug. 27, 2019 in Chinese Application No. 201610293474.9. English translation provided.
(Continued)

*Primary Examiner* — Ponnoreay Pich
(74) *Attorney, Agent, or Firm* — Oblon, McClelland, Maier & Neustadt, L.L.P.

(57) ABSTRACT

An information processing method and a server are provided in the embodiments of this application. First data and second data associated with a first account are respectively received from a first user and a second user and the first data and the second data include at least one piece of first feature content and the second feature content respectively. The at least one piece of the first feature content of the first data is compared with the at least one piece of the second feature content of the second data and a correlation is determined. When the correlation meets a preset correlated condition, the first data is determined to be correlated with the second data and the first account is determined to be belonged to the first user. A first password of the first account is sent to the first user or a second password of the first account is received.

20 Claims, 10 Drawing Sheets

(56) References Cited

U.S. PATENT DOCUMENTS

| | | |
|---|---|---|
| 2010/0306821 A1 | 12/2010 | Catheart et al. |
| 2012/0166553 A1* | 6/2012 | Rubinstein ............ G06Q 50/01 709/206 |
| 2012/0215635 A1 | 8/2012 | Ramer et al. |
| 2014/0259137 A1* | 9/2014 | Park ...................... G06F 3/1271 726/7 |
| 2014/0282919 A1* | 9/2014 | Mason ................ H04L 63/0807 726/4 |
| 2014/0282949 A1* | 9/2014 | Nath .................... H04L 63/083 726/6 |
| 2014/0282969 A1 | 9/2014 | Ye et al. |
| 2014/0325611 A1* | 10/2014 | Iverson ................ H04L 63/083 726/4 |
| 2014/0344356 A1* | 11/2014 | Ramadhan .......... H04L 63/0421 709/204 |
| 2018/0262482 A1* | 9/2018 | Liu ........................ G06N 7/005 |

FOREIGN PATENT DOCUMENTS

| | | |
|---|---|---|
| CN | 103188218 A | 7/2013 |
| CN | 103281192 A | 9/2013 |
| CN | 104104656 A | 10/2014 |
| CN | 105306425 A | 2/2016 |
| EP | 2 863 609 A1 | 4/2015 |
| JP | 2005182354 A | 7/2005 |
| JP | 2012528386 A | 11/2012 |
| WO | 2014139097 A | 9/2014 |
| WO | WO2014/132431 A1 | 9/2014 |

OTHER PUBLICATIONS

International Preliminary Report on Patentability for PCT/CN2017/083050, dated May 4, 2017. Partial English translation provided.
Written Opinion of the ISA for PCT/CN2017/083050, dated Jun. 28, 2017. English translation provided.
International Search Report dated Jun. 28, 2017, in PCT/CN2017/083050, 5 pgs. English translation provided.
Office Action dated Oct. 15, 2019 issued in Japanese Patent Application No. 2018-557835 w/English translation, citing documents AO—AQ, therein. 11 pages.
Extended European Search Report dated Oct. 24, 2019 in European Patent Application No. 17792496.6-1218/3454503 citing documents AA-AC and AR, therein. 7 pages.

* cited by examiner

INFORMATION PROCESSING METHOD AND SERVER

RELATED APPLICATION

This application is a continuation of International Application No. PCT/CN2017/083050, filed on May 4, 2017, which claims priority to Chinese Patent Application No. 201610293474.9, filed on May 5, 2016. The entire disclosures of the prior applications are hereby incorporated by reference in their entirety.

FIELD OF THE TECHNOLOGY

This application relates to the field of network technologies.

BACKGROUND OF THE DISCLOSURE

An account complaint is an account retrieval service that is provided by an account authority to an account owner when an account is stolen, or an account password is forgotten. When filing an account complaint, the account owner needs to submit account complaint data. After the account complaint data passes a review, it may be determined that the account belongs to the account owner, and the account owner may have a permission to change a password of the account, achieving an objective that the account owner retrieves the account.

When the account complaint data is submitted, the data submitted is often incomplete, and the account owner may need to submit account complaint data for two or more times. In addition, due to a network security problem, user data leakage is relatively common. Therefore, when stealing the account of the account owner, the account thief may steal user data of the account owner. To achieve an objective of controlling a stolen account, the account thief often files an account complaint, and submits account complaint data.

There may be multiple pieces of account complaint data of a same account, and the multiple pieces of account complaint data may be submitted by different natural persons. For example, the multiple pieces of account complaint data may not only include account complaint data submitted by an account owner, but also include account complaint data submitted by an account thief. It is considered that the account owner and the account thief are different natural persons.

Currently, when account complaint data is reviewed, multiple pieces of account complaint data of a same account are collected, and then allocated for the customer service or a review system to review. However, if collected multiple pieces of account complaint data of a same account are submitted by different natural persons such as an account owner and an account thief, when a review is performed based on the multiple pieces of account complaint data of the same account, a review result may be inaccurate, and it is possible that the customer service or the review system determines that the account belongs to a non-account owner.

Therefore, how to identify correlated account complaint data from multiple pieces of account complaint data of a same account and determine account complaint data submitted by a same natural person, so as to help to determine ownership of the account seems to be especially necessary.

SUMMARY

In an embodiment of the present disclosure, there is provided an information processing method. First data associated with a first account is received from a first user. The first data includes at least one piece of first feature content. Second data associated with the first account is received from a second user. The second data includes at least one piece of second feature content. The at least one piece of the first feature content of the first data is compared with the at least one piece of the second feature content of the second data. A correlation is determined between the first data and the second data based on the comparison between the at least one piece of the first feature content and the at least one piece of the second feature content. When the correlation meets a preset correlated condition, the first data is determined to be correlated with the second data. When the first data is determined to be correlated with the second data, the first account is determined, by processing circuitry of a server, to be belonged to the first user. A first password of the first account is sent to the first user or a second password of the first account that is entered by the first user is received and the first user accesses the first account by using the first or the second password.

In an embodiment of the present disclosure, there is provided a server. The server includes processing circuitry which receives first data associated with a first account from a first user. The first data includes at least one piece of first feature content. The processing circuitry receives second data associated with the first account from a second user. The second data includes at least one piece of second feature content. The processing circuitry compares the at least one piece of the first feature content of the first data with the at least one piece of the second feature content of the second data. The processing circuitry determines a correlation between the first data and the second data based on the comparison between the at least one piece of the first feature content and the at least one piece of the second feature content. The processing circuitry determines, when the correlation meets a preset correlated condition, that the first data is correlated with the second data. The processing circuitry determines, when the first data is determined to be correlated with the second data, that the first account belongs to the first user and sends a first password of the first account to the first user or receives a second password of the first account that is entered by the first user. The first user accesses the first account by using the first or the second password.

In an embodiment of the present disclosure, there is provided a non-transitory computer-readable medium. The instructions can be executed by a computer to cause the computer to perform operations for information processing.

According to the information processing method provided in embodiments of this application, the server may obtain the first data of the first account submitted by the first user, and perform feature content comparison with the recorded second data of the first account, to determine a correlation between the first data and the second data. The correlation indicates a possibility that the first data is correlated with the second data, and a corresponding preset correlated condition when the multiple pieces of account data of the same account are correlated with each other is preset. Therefore, when the correlation meets the preset correlated condition, it is determined that the first data is correlated with the second data, thereby determining account data that belongs to a same natural person, so as to help to determine account ownership, and increase accuracy of a result of determining the account ownership.

BRIEF DESCRIPTION OF THE DRAWINGS

To describe the technical solutions in the embodiments of this application or the related technology more clearly, the following briefly introduces the accompanying drawings required for describing the embodiments or the related technology. The accompanying drawings in the following description show only embodiments of this application, and a person of ordinary skill in the art may still derive other drawings from the provided accompanying drawings.

DESCRIPTION OF EMBODIMENTS

The following describes the technical solutions in the embodiments of this application with reference to the accompanying drawings in the embodiments of this application. The described embodiments are only some embodiments instead of all embodiments of this application. All other embodiments obtained by a person of ordinary skill in the art based on the embodiments of this application shall fall within the protection scope of this application.

Figure 1:
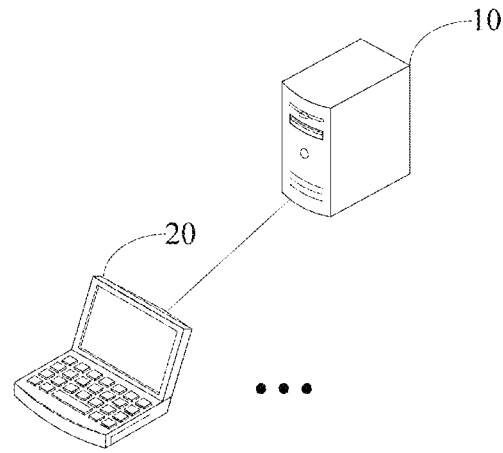
FIG. 1 is a structural block diagram of an account complaint processing system according to an embodiment of this application.

FIG. 1 is a structural block diagram of an information processing system (e.g., an account complaint processing system) according to an embodiment of this application. The account complaint processing method provided in this embodiment of this application may be implemented based on the system shown in FIG. 1. Referring to FIG. 1, the information processing system provided in this embodiment of this application may include a server 10 and at least one terminal 20.

The server 10 may be a device that is disposed on a network side and that is used for processing account complaint data submitted by the terminal. The server 10 may be a single server, or may be a server cluster that includes multiple servers.

The terminal 20 is a device that is on a user side and that is used for submitting account complaint data, for example, a mobile phone, a tablet computer, or a notebook computer. The account complaint data submitted by the terminal 20 may be entered and submitted by an account owner, or may be entered and submitted by an account thief. In this embodiment of this application, account complaint data that is for a same account and that is submitted by the terminal 20 needs to be processed by using the server to determine correlated account complaint data, and determine account complaint data submitted by a same natural person, so as to help to determine ownership of the account, and increase a possibility of determining that the account belongs to the account owner.

Figure 2:
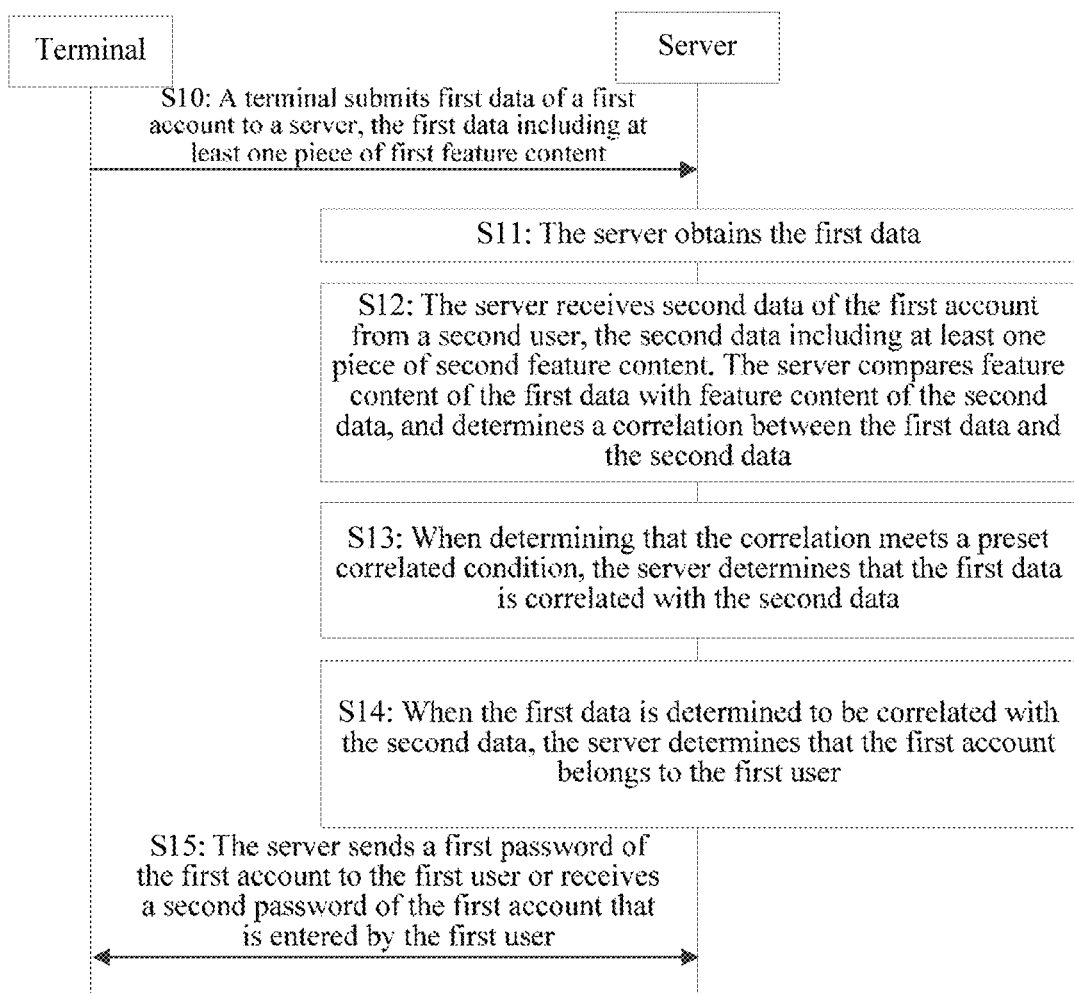
FIG. 2 is a flowchart of an account complaint processing method according to an embodiment of this application.

Based on the system shown in FIG. 1, FIG. 2 is a flowchart of an account complaint processing method according to an embodiment of this application. With reference to FIG. 1 and FIG. 2, the flow may include the following steps S10, S11, S12, S13, S14, and S15.

In step S10, a first user submits first data (e.g. first account complaint data) of a first account to a server by using a terminal.

The first account is an account that needs to be retrieved in this embodiment of this application.

A user of the terminal, that is, the first user, may be an owner of the first account, or may be an account thief. Account complaint data has at least one piece of feature content, and the feature content may be a piece of specific complaint data in the account complaint data.

In step S11, the server obtains the first account complaint data. For example, the server receives first data associated with a first account from a first user.

The first account complaint data may include at least one piece of feature content. For example, the first data includes at least one piece of first feature content.

In step S12, when determining that there is second account complaint data of the first account, the server separately compares feature content of the first account complaint data with feature content of the second account complaint data, and determines a correlation between the first account complaint data and the second account complaint data. For example, the server receives second data associated with the first account from a second user, the second data including at least one piece of second feature content. The server compares the at least one piece of the first feature content of the first data with the at least one piece of the second feature content of the second data and determines a correlation between the first data and the second data based on the comparison between the at least one piece of the first feature content and the at least one piece of the second feature content.

In an embodiment, the second account complaint data may be account complaint data of the first account that is historically recorded by the server and that is submitted by a second user. In this embodiment of this application, the second account complaint data may be generated based on account complaint data uploaded by an owner of the first account, or may be generated based on account complaint data uploaded by an account thief. Therefore, an objective of this embodiment of this application is to determine whether the first account complaint data and the second account complaint data of the first account are correlated with each other, that is, whether the first user and the second user are a same natural person, so as to help to determine ownership of the first account according to a determining result.

In this embodiment of this application, after the first account complaint data and the second account complaint data are obtained, the feature content of the first account complaint data and the feature content of the second account complaint data may be separately compared, to determine a comparison result of the feature content. In this embodiment of this application, based on the comparison result of the feature content of the first account complaint data and the second account complaint data, the correlation between the first account complaint data and the second account complaint data may be determined. The correlation may be used for indicating a possibility that the first account complaint data is correlated with the second account complaint data, that is, a possibility that the first user submitting the first account complaint data and the second user submitting the second account complaint data are a same natural person.

In step S13, when determining that the correlation meets a preset correlated condition, the server determines that the first data is correlated with the second data.

The preset correlated condition may indicate a target correlation between the corresponding account complaint data when multiple pieces of account complaint data of a same account are correlated with each other (for example, the multiple pieces of account complaint data of the same account belong to a same natural person). Therefore, in this embodiment of this application, when the correlation between the first account complaint data and the second account complaint data meets the preset correlated condition, it may be determined that the first account complaint data is correlated with the second account complaint data, thereby determining that the first user submitting the first account complaint data and the second user submitting the second account complaint data are the same natural person.

In step S14, when the first data is determined to be correlated with the second data, the server determines, according to one or more of the first data and the second data, that the first account belongs to the first user.

In step S15, the server sends a password of the first account to the first user or receives a password of the first account that is entered by the first user, so that the first user accesses and operates the first account by using the first or the second password.

It can be seen that, in this embodiment of this application, the server may obtain the first account complaint data of the first account submitted by the first user, and perform feature content comparison with the recorded second account complaint data of the first account, to determine the correlation between the first account complaint data and the second account complaint data. The correlation indicates a possibility that the first account complaint data is correlated with the second account complaint data, and a corresponding preset correlated condition when the multiple pieces of account complaint data of the same account are correlated with each other is preset. Therefore, when the correlation meets the preset correlated condition, it is determined that the first account complaint data is correlated with the second account complaint data, that is, the first user submitting the first account complaint data and the second user submitting the second account complaint data are a same natural person, so as to help to determine account ownership, and increase accuracy of a result of determining the account ownership.

The following describes the account complaint processing method from the perspective of the server. The account complaint processing method described in the following may be cross-referenced with the flow content described in the foregoing.

Figure 3:
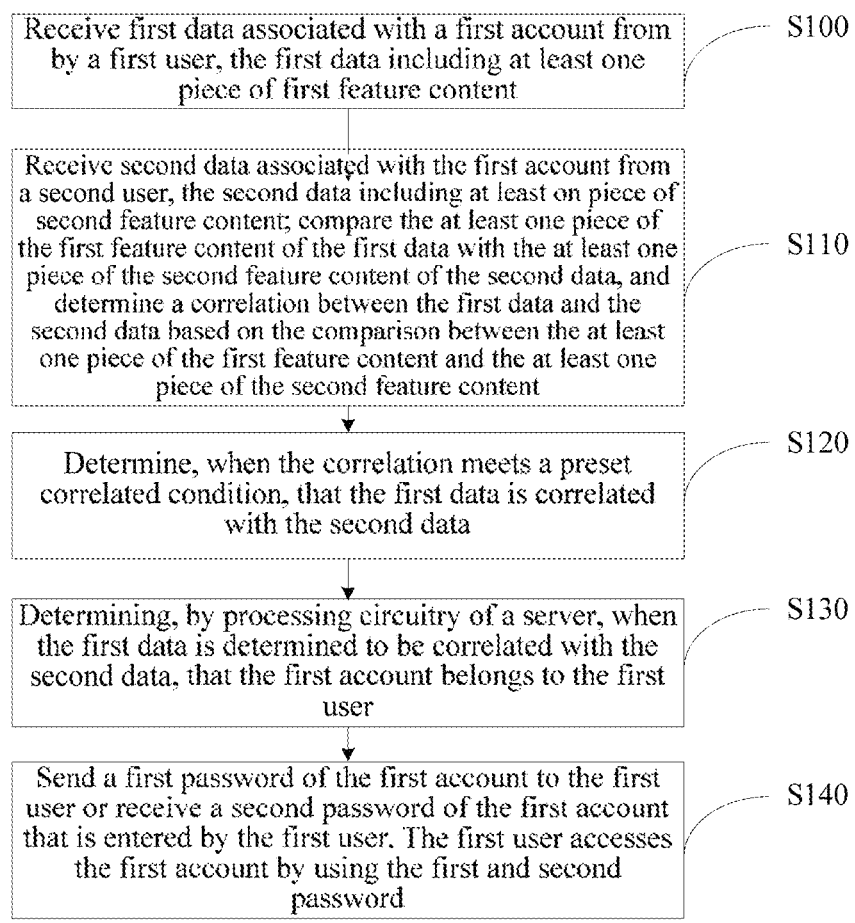
FIG. 3 is a flowchart of an account complaint processing method according to an embodiment of this application.

FIG. 3 is a flowchart of an account complaint processing method according to an embodiment of this application. The method may be applied to a server. The server may be a server that is set by an account authority to file an account complaint, and the server may collect account complaint data submitted by a user. Referring to FIG. 3, the account complaint processing method provided in this embodiment of this application may include the following steps S100, S110, S120, S130, and S140.

In step S100, obtain first account complaint data of a first account submitted by a first user. For example, first data associated with a first account is received from a first user, the first data including at least one piece of first feature content.

The first account is an account that needs to be retrieved in this embodiment of this application. The first account complaint data may be complaint data that is submitted by the first user to the server by using a terminal and that is used for retrieving the first account. The first user may be an owner of the first account, or may be an account thief.

In an embodiment, account complaint data may include at least one piece of feature content, and the feature content may be a piece of specific complaint data in the account complaint data. Specifically, a piece of feature content may correspond to a piece of specific content entered for an item that needs to be entered when an account complaint is filed.

When account complaint data is entered, the terminal may display at least one item that needs to be entered. The item that needs to be entered includes contact information (such as a mobile phone and an e-mail), personal information (such as a name, an ID card, and an address), usage data (such as a used password, a security problem, and a bound mobile phone), or the like. Feature content may further include a terminal identifier, a network IP, and the like that is automatically extracted by a terminal and that is carried in account complaint data.

It is noteworthy that, different account types may correspond to different items that need to be entered. For example, an item that needs to be entered and that corresponds to a social-type account may include: contact information, personal information, usage data, or a social relationship (such as friend information). For another example, an item that needs to be entered and that corresponds to a game-type account may include: contact information, personal information, usage data, a game character name, or the like. Therefore, when an account complaint is filed, a specific item that needs to be entered may be determined according to an actual account type and application scenario, and is not strictly limited.

Figure 4:
FIG. 4 is a schematic diagram of a corresponding part of feature content when an account complaint is filed against a social-type account.

For convenience of understanding, FIG. 4 shows a corresponding part of feature content when an account complaint is filed for a social-type account.

In step S110, when there is second account complaint data of the first account, compare feature content of the first account complaint data with feature content of the second account complaint data, and determine a correlation between the first account complaint data and the second account complaint data. For example, second data associated with the first account is received from a second user, the second data including at least one piece of second feature content. The at least one piece of the first feature content of the first data is compared with the at least one piece of the second feature content of the second data and a correlation is determined between the first data and the second data based on the comparison between the at least one piece of the first feature content and the at least one piece of the second feature content.

In an embodiment, the second account complaint data may be account complaint data that is of the first account and that is historically recorded by the server. A time when the second account complaint data is submitted to the server may be earlier than a time when the first account complaint data is submitted to the server. The second account complaint data may be generated based on account complaint data that is submitted earlier than the first account complaint data.

In an embodiment, the second account complaint data may be generated based on account complaint data uploaded by an owner of the first account, or may be generated based on account complaint data uploaded by an account thief. Therefore, an objective of this embodiment of this application is to determine whether the first account complaint data and the second account complaint data for the first account are correlated with each other, so as to help to determine ownership of the first account according to a determining result.

After determining the first account complaint data and the second account complaint data of the first account, the server may determine, by means of processing of specific content of the first account complaint data and the second account complaint data, a possibility that the first account complaint data is correlated with the second account complaint data (which is referred to as the correlation between the first account complaint data and the second account complaint data).

Specifically, in this embodiment of this application, the feature content of the first account complaint data with the feature content of the second account complaint data may be compared, to determine a comparison result of the feature content. Both the first account complaint data and the second account complaint data have feature content of contact information, and feature content of personal information. Then, in this embodiment of this application, the feature content of the contact information and the feature content of the personal information of the first account complaint data and the second account complaint data may be separately compared, thereby obtaining a comparison result of each piece of feature content.

The correlation between the first account complaint data and the second account complaint data may be determined based on the comparison result of each piece of feature content of the first account complaint data and the second account complaint data.

For example, the correlation may be a probability that the first account complaint data is correlated with the second account complaint data.

In step S120, when the correlation meets a preset correlated condition, the first data is determined to be correlated with the second data.

In an embodiment, in this embodiment of this application, a corresponding preset correlated condition when the multiple pieces of account complaint data of the same account are correlated with each other may be preset (for example, the preset correlated condition is a target correlation between corresponding account complaint data when the multiple pieces of account complaint data of the same account are correlated with each other, where the target correlation may indicate a corresponding target possibility when the multiple pieces of account complaint data of the same account are correlated with each other), so that when the correlation meets the preset correlated condition, it is determined that the possibility that the first account complaint data is correlated with the second account complaint data is not less than the target possibility, thereby determining that the first account complaint data is correlated with the second account complaint data.

In an embodiment, a corresponding target probability when multiple pieces of account complaint data of a same account are correlated with each other may be set, so that when a probability that the first account complaint data is correlated with the second account complaint data is determined and the probability is not less than the target probability, it is determined that the first account complaint data is correlated with the second account complaint data.

In step S130, determine, according to one or more of the first account complaint data or the second account complaint data, that the first account belongs to the first user. For example, when the first data is determined to be correlated with the second data, the first account is determined, by processing circuitry of a server, to be belonged to the first user.

In step S140, send a first password of the first account to the first user or receive a second password of the first account that is entered by the first user, so that the first user accesses and operates the first account by using the first or the second password.

It can be seen that, an account complaint processing method provided in embodiments of this application includes: obtaining, by a server, first account complaint data of a first account submitted by a first user, account complaint data including at least one piece of feature content; comparing, when there is second account complaint data of the first account, feature content of the first account complaint data with feature content of the second account complaint data, to determine a correlation between the first account complaint data and the second account complaint data; determining, when the correlation meets a preset correlated condition, that the first account complaint data is correlated with the second account complaint data; determining, according to one or more of the first account complaint data and the second account complaint data, that the first account belongs to the first user; and sending a password of the first account to the first user or receiving a password of the first account that is entered by the first user, so that the first user operates the first account by using the password.

In this embodiment of this application, the server may obtain the first account complaint data of the first account submitted by the first user, and perform feature content comparison with the recorded second account complaint data of the first account, to determine a correlation between the first account complaint data and the second account complaint data. The correlation indicates a possibility that the first account complaint data is correlated with the second account complaint data, and a corresponding preset correlated condition when the multiple pieces of account complaint data of the same account are correlated with each other is preset. Therefore, when the correlation meets the preset correlated condition, it is determined that the first account complaint data is correlated with the second account complaint data, thereby determining account complaint data that belongs to a same natural person, so as to help to determine account ownership, and increase accuracy of a result of determining the account ownership.

In an embodiment, after it is determined that the first account complaint data is correlated with the second account complaint data, the first account complaint data and the second account complaint data may be combined, so that when ownership of the first account is reviewed and determined, a probability of determining that the first account belongs to an account owner thereof may be increased by using the combined first account complaint data and second account complaint data, thereby increasing accuracy of determining the ownership of the first account.

In an embodiment, if the correlation between the first account complaint data and the second account complaint data does not meet the preset correlated condition, it may be considered that the first account complaint data is uncorrelated with the second account complaint data, and when account complaint data is subsequently reviewed, the first account complaint data and the second account complaint data may be separately reviewed.

In this embodiment of this application, when each piece of feature content is compared between the first account complaint data and the second account complaint data, differentiation comparison may be performed on each piece of feature content, thereby determining a differentiation level of each piece of feature content, and a differentiation degree between the first account complaint data and the second account complaint data is comprehensively analyzed based on the differentiation level of each piece of feature content, to determine the correlation between the first account complaint data and the second account complaint data.

In an embodiment, for example, the differentiation level includes: feature content is the same, feature content is similar, feature content is not similar, feature content is completely different, or the like. In this embodiment of this application, that feature content being the same and feature content being similar are used as two types of differentiation levels. Based on different account complaint cases, used differentiation levels may be not limited to the two types: feature content is the same and feature content is similar.

Figure 5:
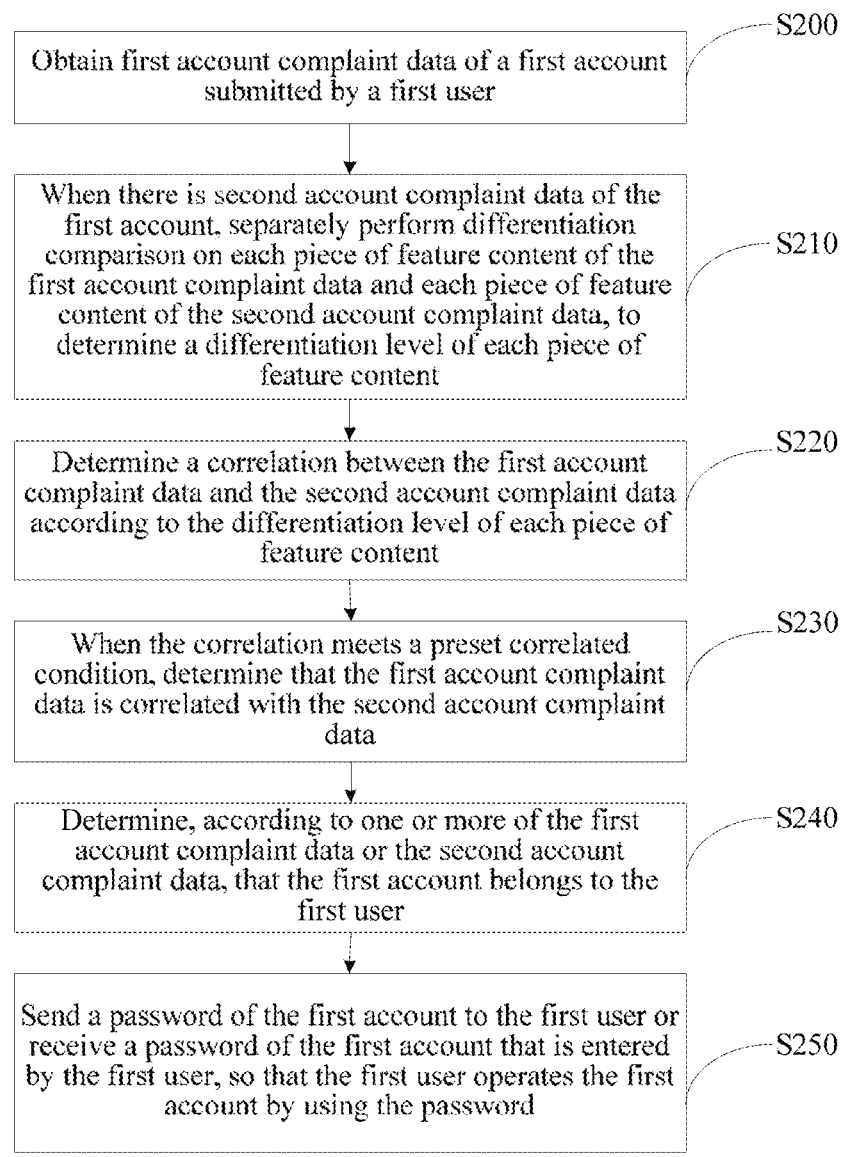
FIG. 5 is another flowchart of an account complaint processing method according to an embodiment of this application.

FIG. 5 is another flowchart of an account complaint processing method according to an embodiment of this application. Referring to FIG. 5, the method may include the following steps S200, S210, S220, S230, S240, and S250.

In step S200, obtain first account complaint data of a first account submitted by a first user. For example, first data associated with a first account is received from a first user, the first data including at least one piece of first feature content.

In step S210, when there is second account complaint data of the first account, separately perform differentiation comparison on each piece of feature content of the first account complaint data and each piece of feature content of the second account complaint data, to determine a differentiation level of each piece of feature content. For example, second data associated with a first account is received from a second user, the second data including at least one piece of second feature content. Differentiation comparison is performed on each of the at least one piece of the first feature content of the first data and each of the at least one piece of the second feature content of the second data respectively to determine a differentiation level of each of the at least one piece of the first and the second feature content.

In step S220, determine a correlation between the first data and the second data according to the differentiation level of each of the at least one piece of the first and the second feature content.

The correlation may indicate a possibility that the first account complaint data is correlated with the second account complaint data.

In step S230, when the correlation meets a preset correlated condition, determine that the first data is correlated with the second data.

In an embodiment, the determined differentiation level of each piece of feature content may include: feature content is the same and feature content is similar. If a piece of feature content is the same, it may be considered that, the piece of feature content is completely the same in the first account complaint data and the second account complaint data. If a piece of feature content is similar, it may be considered that, the piece of feature content is partially the same in the first account complaint data and the second account complaint data, and a range of the same part is not less than a specified range.

In an embodiment, the range of the same part is not less than the specified range. For example, a ratio of a quantity of characters in the same part to a total quantity of characters in the piece of feature content is not less than a specified ratio, a quantity of characters in the same part is not less than a specified quantity, or the like. A specific requirement for the range of the same part being not less than the specified range may be determined according to an actual case, and is not limited to the description in this paragraph.

An item that needs to be entered for a social relationship in account complaint data of a social-type account is used as an example. If feature content of an item that needs to be entered for a social relationship in first account complaint data is $a1$, $a2$, $a3$, $a4$, $a5$, and $a6$ (referring to information such as a friend's nickname), and feature content of an item that needs to be entered for a social relationship in second account complaint data is also $a1$, $a2$, $a3$, $a4$, $a5$, and $a6$, because the feature content of the social relationship is completely the same between the first account complaint data and the second account complaint data, it is considered that a differentiation level of feature content of the items that need to be entered for the social relationships in the first account complaint data and the second account complaint data is that feature content is the same.

If the feature content of the item that needs to be entered for the social relationship in the first account complaint data is $a1$, $a2$, $a3$, $a4$, $a5$, and $a6$, and the feature content of the item that needs to be entered for the social relationship in the second account complaint data is also $a1$, $a2$, $a3$, $a4$, and $a7$, in the feature content of the items that need to be entered for the social relationships in the first account complaint data and the second account complaint data, four pieces of friend information are the same, and the ratio is not less than the specified ratio or the quantity is not less than the specified quantity (a specific numerical value may be determined according to an actual case). Then, it may be considered that the differentiation level of the feature content of the items that need to be entered for the social relationships in the first account complaint data and the second account complaint data is that feature content is similar.

A principle of determining a differentiation level of feature content of other items in the first account complaint data and the second account complaint data is similar to the foregoing description, and cross-reference may be made.

In step S240, determine, according to one or more of the first account complaint data or the second account complaint data, that the first account belongs to the first user. For example, when the first data is determined to be correlated with the second data, the first account is determined, by processing circuitry of a server, to be belonged to the first user.

In step S250, send a first password of the first account to the first user or receive a second password of the first account that is entered by the first user. The first user accesses and operates the first account by using the first or the second password.

In an embodiment, by using the determined differentiation level of each piece of feature content in the first account complaint data and the second account complaint data, it may be determined whether there is a strong correlation or a weak correlation between the first account complaint data and the second account complaint data. The strong correlation may be considered that the determined correlation between the first account complaint data and the second account complaint data meets a first correlation, and the weak correlation may be considered that the determined correlation between the first account complaint data and the second account complaint data meets a second correlation. The first correlation is higher than the second correlation. Therefore, when it is determined that there is a strong correlation between the first account complaint data and the second account complaint data, it is determined that the correlation between the first account complaint data and the second account complaint data meets the preset correlated condition, and the first account complaint data and the second account complaint data are correlated with each other, that is, belong to a same natural person.

Figure 6:
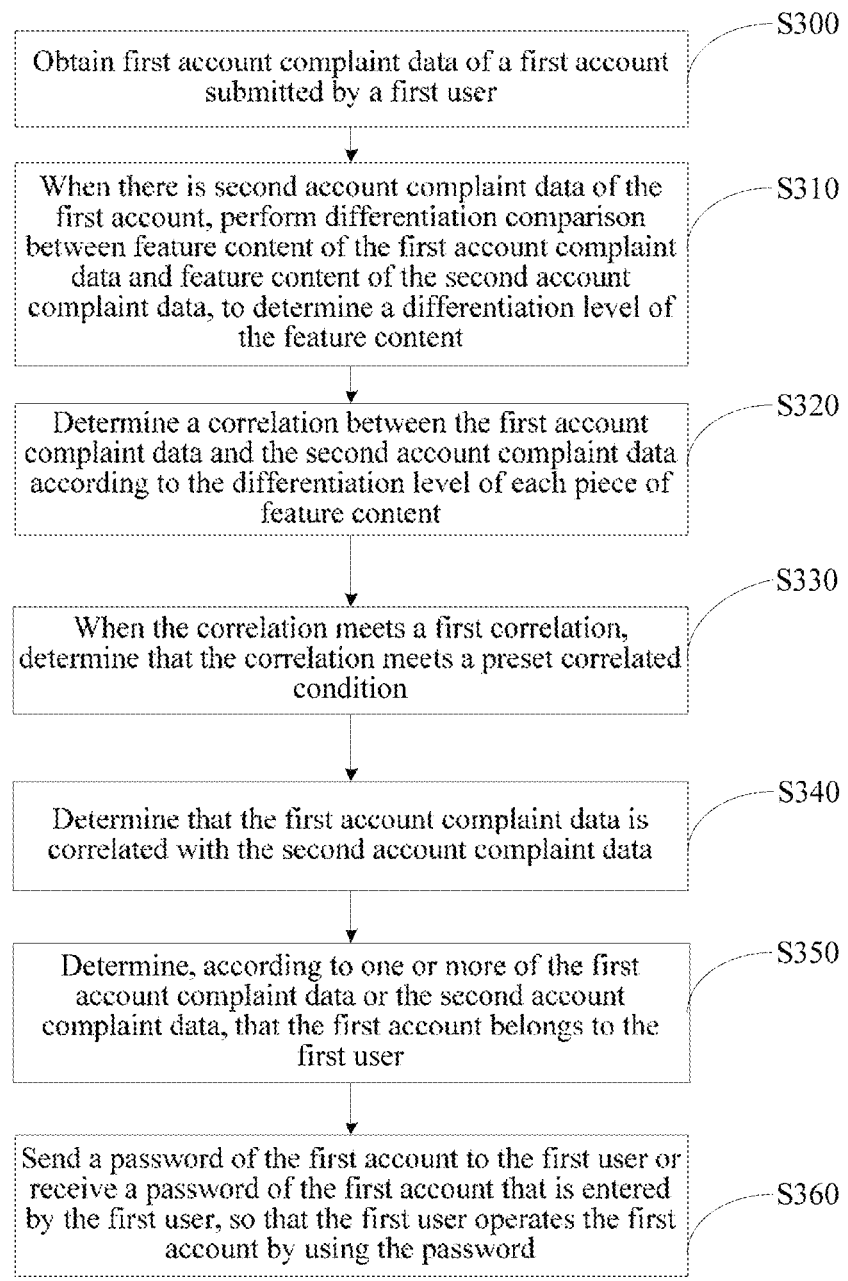
FIG. 6 is still another flowchart of an account complaint processing method according to an embodiment of this application.

In an embodiment, descriptions are provided by assuming that the differentiation level includes feature content being the same and feature content being similar. FIG. 6 is still another flowchart of an account complaint processing method according to an embodiment of this application. Referring to FIG. 6, the method may include the following steps S300, S310, S320, S330 S340, S350, and S360.

In step S300, obtain first account complaint data of a first account submitted by a first user. For example, first data associated with a first account is received from a first user, the first data including at least one piece of first feature content.

In step S310, when there is second account complaint data of the first account, perform differentiation comparison between feature content of the first account complaint data and feature content of the second account complaint data, to determine a differentiation level of the feature content, where the differentiation level includes: feature content is the same and feature content is similar. For example, second data associated with the first account is received from a second user, the second data including at least one piece of second feature content. The at least one piece of the first feature content of the first data is compared with the at least one piece of the second feature content of the second data and a correlation is determined between the first data and the second data based on the comparison between the at least one piece of the first feature content and the at least one piece of the second feature content. The at least one differentiation level indicates that the at least one piece of the first feature content and the at least one piece of the second feature content is the same or similar.

In step S320, determine a correlation between the first data and the second account according to the differentiation level of each piece of feature content.

In step S330, when the correlation meets a first correlation, determine that the correlation meets a preset correlated condition, where that the correlation meets a first correlation includes: each piece of feature content is the same; or a part of feature content is the same and another part of feature content is similar, a type of feature content of the same feature content meets a preset first type, and a type of feature content of the similar feature content meets a preset second type. For example, the preset correlated condition is that each of the at least one piece of the first feature content is the same as one of the at least piece of the second feature content, or one part of the first feature content and one part of the second feature content of a preset first type is the same, another part of the first feature content and another part of the second feature content of a preset second type is similar.

That a part of feature content is the same and another part of feature content is similar indicates that feature content in the first account complaint data and the second account complaint data is divided into two parts: a same part and a similar part. That a type of feature content of the same feature content meets a preset first type may be considered that, the type of feature content of the same feature content should include at least the preset first type, that is, the type of feature content of the same feature content should include at least the preset first type, and may also include another type.

That a type of feature content of the similar feature content meets a preset second type may be considered that, the type of the feature content of the similar feature content may only fall within a range of the preset second type, and should not exceed the range.

In an embodiment, the preset first type may be at least one feature content type selected from multiple feature content types that need to be entered. Using a social-type account as an example, the preset first type may be contact information, a terminal identifier, an IP, personal information, or the like, and the preset second type may be at least one feature content type selected from multiple feature content types that need to be entered, for example, usage data and a social relationship.

In the preset first type and the preset second type, each type may be different, or some types may be the same.

Using a social-type account as an example, that the correlation between the first account complaint data and the second account complaint data meets the first correlation may be:

contact information is the same;

an IP is different (an IP for submitting account complaint data is the same);

a terminal identifier is the same (an identifier of a terminal for submitting account complaint data is the same);

personal information is the same;

usage data is similar (for example, first time, six passwords are entered, and second time, five passwords are entered; four passwords are the same between the two times); and a social relationship is similar (first time, six friends are invited for the, and second time, five friends are invited; four friends are the same between the two times).

Alternatively, that the correlation between the first account complaint data and the second account complaint data meets the first correlation may be:

contact information is the same;

an IP is the same;

a terminal identifier is the same;

personal information is the same;

usage data is the same; and a social relationship is the same.

It is noteworthy that, that the correlation between the first account complaint data and the second account complaint data meets the first correlation may be: a policy that is set in this embodiment of this application and that forcibly determines that the first account complaint data is correlated with the second account complaint data; specific content of the first correlation may be determined according to an actual account type and application scenario.

In step S340, determine that the first data is correlated with the second data.

In step S350, determine, according to one or more of the first data or the second data, that the first account belongs to the first user.

In step S360, send a first password of the first account to the first user or receive a second password of the first account that is entered by the first user, so that the first user accesses and operates the first account by using the first and or the second password.

In an embodiment, first correlation content that forcibly determines that the first account complaint data is correlated with the second account complaint data is set, and in addition, an algorithm model that can determine the probability that the first account complaint data is correlated with the second account complaint data is trained, and the correlation between the first account complaint data and the second account complaint data is indicated by using the determined probability, thereby determining whether the first account complaint data is correlated with the second account complaint data.

In an embodiment, a Bayes classification model may be selected as the algorithm model. The Bayes classification model is generated based on a Bayes classification algorithm, is a classification model in statistics, and can perform classification by using probability statistic knowledge. In many occasions, the Bayes classification algorithm may be comparable to a decision tree algorithm and a neural network classification algorithm, and the algorithm can be applied to a large database. In addition, the algorithm has a simple method, high classification accuracy, and a high speed. Therefore, in this embodiment of this application, the Bayes classification model may be pre-trained, and the probability that the first account complaint data is correlated with the second account complaint data is calculated by using the Bayes classification model, thereby determining the correlation between the first account complaint data and the second account complaint data.

Figure 7:
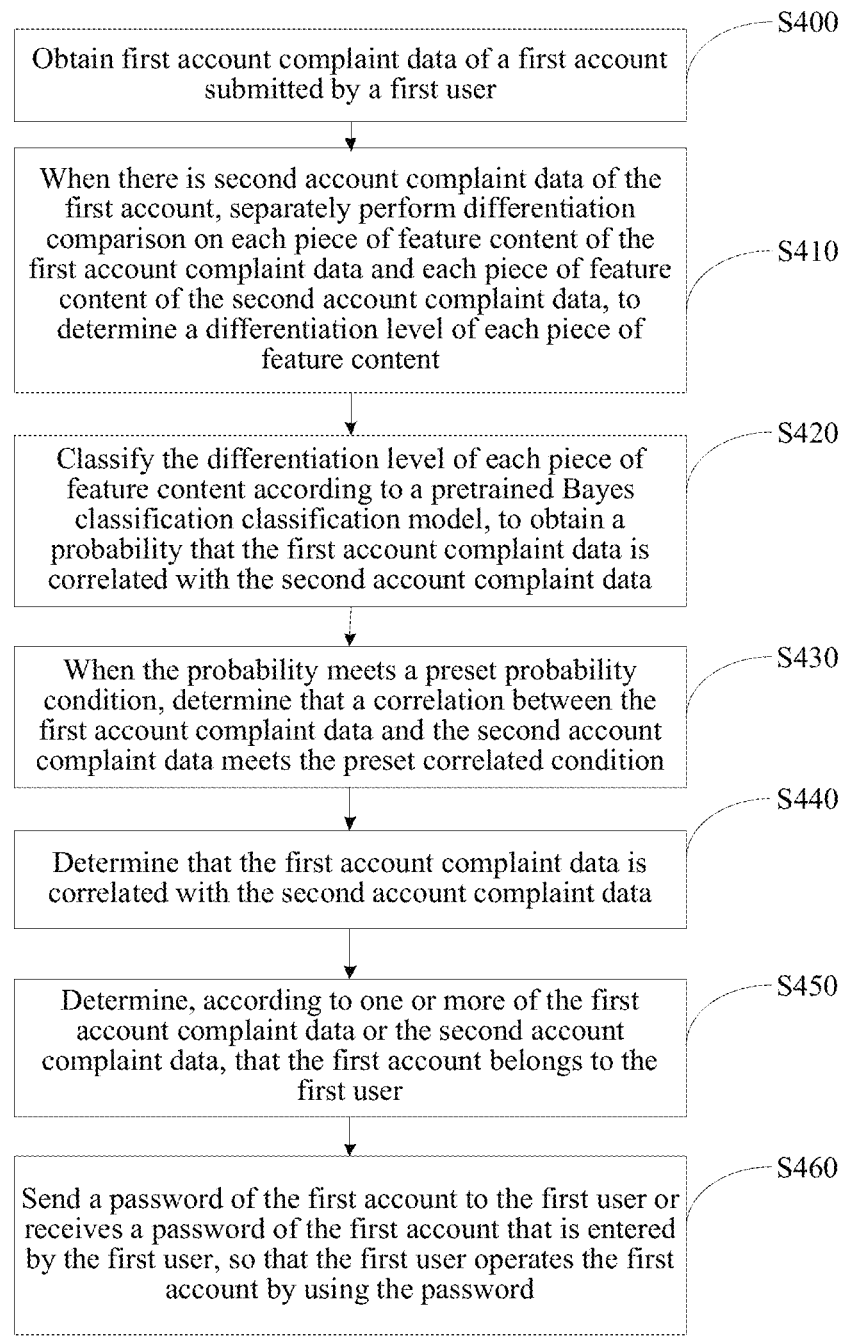
FIG. 7 is yet another flowchart of an account complaint processing method according to an embodiment of this application.

Correspondingly, FIG. 7 is another flowchart of an account complaint processing method according to an embodiment of this application. According to the method shown in FIG. 7, an account complaint is processed mainly by using the Bayes classification model. It may be implemented independently from a manner for processing an account complaint by using the first correlation according to the method shown in FIG. 6. Referring to FIG. 7, the method may include the following steps S400, S410, S420, S430, S440, S450, and S460.

In step S400, obtain first account complaint data of a first account submitted by a first user. For example, first data associated with a first account is received from a first user, the first data including at least one piece of first feature content.

In step S410, when there is second account complaint data of the first account, separately perform differentiation comparison on each piece of feature content of the first account complaint data and each piece of feature content of the second account complaint data, to determine a differentiation level of each piece of feature content. For example, differentiation comparison is performed on each of the at least one piece of the first feature content of the first data and each of the at least one piece of the second feature content of the second data respectively to determine a differentiation level of each of the at least one piece of the first and the second feature content.

In step S420, classify the differentiation level of each piece of feature content according to a pre-trained Bayes classification model, to obtain a probability that the first data is correlated with the second data.

The probability may indicate a correlation between the first account complaint data and the second account complaint data.

The differentiation level herein includes at least: feature content is the same and feature content is similar.

In step S430, when the probability meets a preset probability condition, determine that a correlation between the first data and the second data meets the preset correlated condition.

In step S440, determine that the first data is correlated with the second data.

In step S450, determine, according to one or more of the first account or the second data, that the first account belongs to the first user.

In step S460, send a password of the first account to the first user or receives a password of the first account that is entered by the first user, so that the first user operates the first account by using the password.

Figure 8:
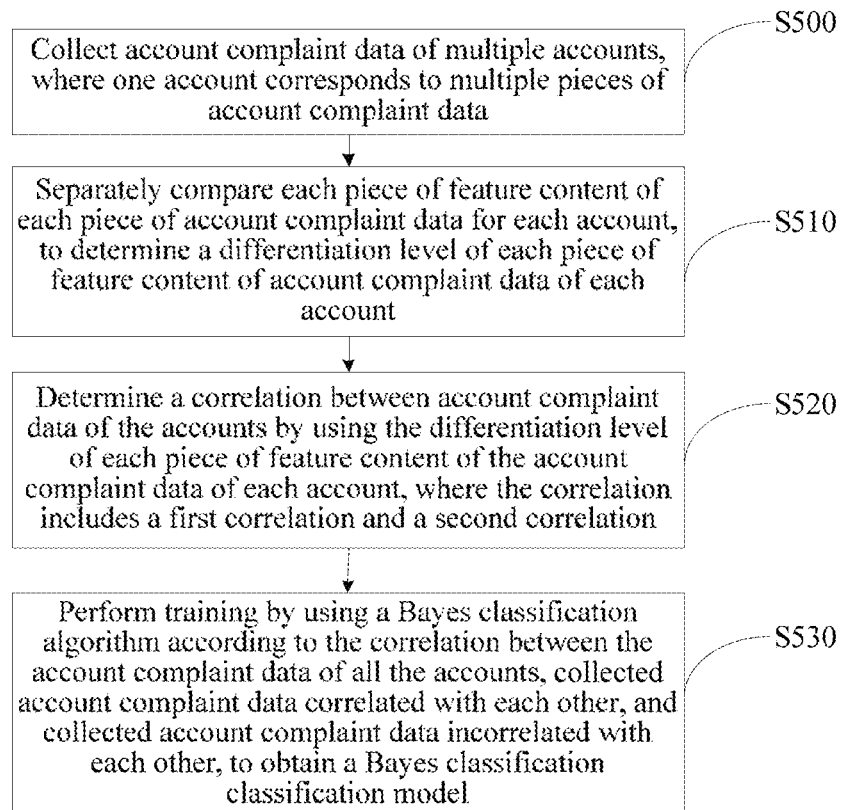
FIG. 8 is a flowchart of a Bayes classification model pre-training method according to an embodiment of this application.

In an embodiment, FIG. 8 shows a process of pre-training a Bayes classification model. Referring to FIG. 8, the process may include the following steps S500, S510, S520, and S530.

In step S500, collect account complaint data of multiple accounts, where one account corresponds to multiple pieces of account complaint data. For example, account data of multiple accounts is collected. One account of the multiple accounts corresponds to more than one piece of account data associated with the account.

In this embodiment of this application, account complaint data of a massive quantity of accounts may be collected to perform subsequent training of the Bayes classification model. There may be multiple pieces of collected account complaint data of one account, and the multiple pieces of account complaint data of one account may include some pieces submitted by an account owner, or may include some pieces submitted by an account thief.

In step S510, separately compare each piece of feature content of each piece of account complaint data for each account, to determine a differentiation level of each piece of feature content of account complaint data of each account. For example, each piece of feature content of each piece of account data for each account of the multiple accounts is compared to determine a differentiation level of each piece of the feature content of the account data of each account of the multiple accounts.

In this embodiment of this application, multiple pieces of account complaint data of one account is used as a unit, to process the account complaint data of each account, and determine the differentiation level of each piece of feature content of the account complaint data of each account. In this embodiment of this application, for each account, each piece of feature content of each piece of account complaint data may be compared, to identify the differentiation level of each piece of feature content of the account complaint data. For a specific process of determining the differentiation level of each piece of feature content of the account complaint data, refer to the description in the corresponding part in the foregoing.

In this embodiment of this application, for multiple pieces of account complaint data of a same account, pairwise comparison may be performed on each piece of feature content of the account complaint data, and combined account complaint data after the pairwise comparison may be further compared with each piece of feature content of another piece of account complaint data of the same account.

In step S520, determine a correlation between account complaint data of the accounts by using the differentiation level of each piece of feature content of the account complaint data of each account, where the correlation includes a first correlation and a second correlation. For example, a correlation is determined between account data of the multiple accounts by using the differentiation level of each piece of the feature content of the account data of each account of the multiple accounts. The correlation includes a first correlation and a second correlation, the first correlation indicates that each piece of the feature content of the account data of each account of the multiple accounts is the same, or one part of the feature content of the account data of each account of the multiple accounts of a preset first type is the same, another part of the feature content of the account data of each account of the multiple accounts of a preset second type is similar.

As described in the foregoing that, the first correlation indicates that there is a strong correlation between account complaint data of a same account, and the second correlation indicates that there is a weak correlation between the account complaint data of the same account.

In an embodiment, an example in which the differentiation level includes feature content being the same and feature content being similar is used. The first correlation may indicate that each piece of feature content is the same; or a part of feature content is the same and another part of feature content is similar, a type of feature content whose feature content is the same meets a preset first type, and a type of feature content whose feature content is similar meets a preset second type.

In an embodiment, the second correlation may indicate that each piece of feature content in multiple pieces of account complaint data of a same account is similar. Using a social-type account as an example, that a correlation between account complaint data of an account is the second correlation may be:

contact information is similar (for example, abcd@qq.com and abcd2016@qq.com);

an IP is similar (for example, 1.2.3.4 and 1.2.3.5);

personal information is similar (for example, a name for a first lading bill is Jie Liu, and a name for a second lading bill is Jie);

usage data has low similarity (that usage data is similar may be that, for example, a quantity of same characters in a password reaches a first value, for example, four same characters; that usage data has low similarity may be that, for example, a quantity of same characters in a password is less than the first value and greater than a second value, where the first value is greater than the second value, for example, two same characters in the password); and a social relationship is similar.

In step S530, perform training by using a Bayes classification algorithm according to the correlation between the account complaint data of all the accounts, collected account complaint data correlated with each other, and collected account complaint data uncorrelated with each other, to obtain a Bayes classification model. For example, training is performed by using a Bayes classification algorithm according to the correlation between the account data of each account of the multiple accounts, collected account data correlated with each other, and collected account data uncorrelated with each other, to obtain the Bayes classification model.

In this embodiment of this application, after collected account complaint data of a massive quantity of accounts is processed, to determine the correlation between the account complaint data of all the accounts, training may be performed based on extracted positive and negative sample data by using the Bayes classification algorithm.

The positive sample data may be considered as correlated account complaint data that is collected and extracted, and the negative sample data may be considered as uncorrelated account complaint data that is collected and extracted. The positive and negative sample data may be mainly obtained by means of manual selection and user complaint data.

In this embodiment of this application, a correlation between correlated account complaint data and a correlation between uncorrelated account complaint data may be analyzed by using the collected correlated account complaint data and uncorrelated account complaint data, thereby training the correlation between the account complaint data of all the accounts by using the analyzed correlation between correlated account complaint data and correlation between uncorrelated account complaint data as a classification reference and by using the Bayes classification algorithm, to obtain an algorithm formula that can calculate a probability that multiple pieces of account complaint data of a same account are correlated with each other, and train the Bayes classification model.

Figure 9:
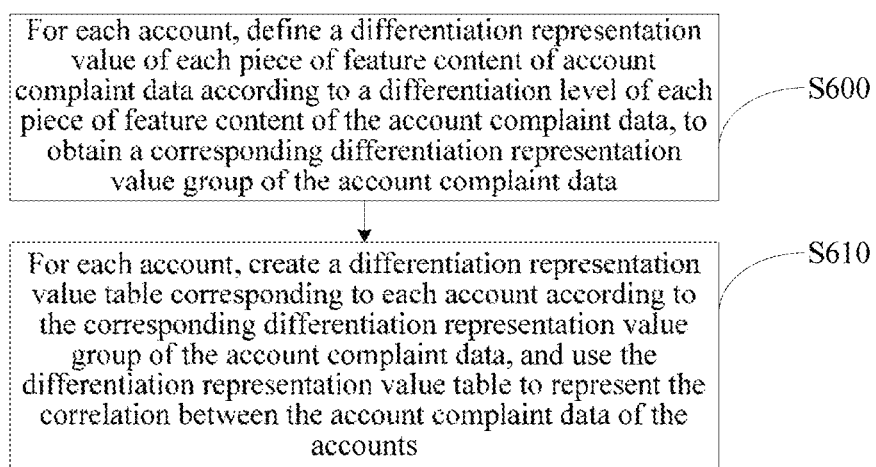
FIG. 9 is a flowchart of determining a correlation between account complaint data of accounts according to an embodiment of this application.

In this embodiment of this application, for convenience of training of the Bayes classification model, a differentiation level of each piece of feature content of account complaint data may be numerically represented. Specifically, a process, in the method shown in FIG. 8, of determining the correlation between the account complaint data of all the accounts may be shown in FIG. 9, and includes the following steps S600 and S610.

In step S600, for each account, define a differentiation representation value of each piece of feature content of account data according to a differentiation level of each piece of feature content of the account data, to obtain a corresponding differentiation representation value group of the account complaint data.

In an embodiment, the differentiation representation value group may be obtained by grouping differentiation representation values defined based on a differentiation level of each piece of feature content of pairwise account complaint data; the differentiation representation value includes a first value that indicates that feature content is the same and a second value that indicates that feature content is similar, and the first value is different from the second value. The first value may be 1, and the second value may be 0. Specific numerical values of the first value and the second value may be determined according to an actual case, and a form in which the first value is 1 and the second value is 0 is only an example.

In this embodiment of this application, after each piece of feature content of the multiple pieces of account complaint data of the same account is compared, the differentiation level of each piece of feature content may be represented by using 1 and 0. If the comparison shows that a piece of feature content is the same, a differentiation representation value 1 may be defined for the piece of feature content. If the comparison shows that a piece of feature content is similar, a differentiation representation value 0 may be defined for the piece of feature content.

In this embodiment of this application, a differentiation representation value group 11100 corresponding to account complaint data of the account may be obtained after the differentiation representation value of each piece of feature content is defined for the following comparison result:

an IP is the same (the differentiation representation value 1 is defined);

a terminal identifier is the same (the differentiation representation value 1 is defined);

personal information is the same (the differentiation representation value 1 is defined);

usage data is similar (the differentiation representation value 0 is defined); and a social relationship is similar (the differentiation representation value 0 is defined).

In step S610, for each account, create a differentiation representation value table corresponding to each account according to the corresponding differentiation representation value group of the account complaint data, and use the differentiation representation value table to represent the correlation between the account data of the accounts.

In an embodiment, a differentiation representation value table of an account may have at least one differentiation representation value group, and one differentiation representation value group indicates a group of a differentiation representation value of each piece of feature content in two pieces of account complaint data of the account.

In an embodiment, a form of a differentiation representation value table of an account is as follows, where 1 0 0 0 0 is a differentiation representation value group, and 1 1 0 1 0 is another differentiation representation value group:

1 0 0 0 0
1 1 0 1 0

It can be seen that, a differentiation representation value table of an account is actually in a form of a matrix.

In this embodiment of this application, after a differentiation representation value table corresponding to each account is obtained, a matrix group including multiple matrices may be obtained, thereby training the correlation between the account complaint data of all the accounts by using the analyzed correlation between correlated account complaint data and correlation between uncorrelated account complaint data as a classification reference and by using the Bayes classification algorithm, to obtain an algorithm formula that can calculate a probability that multiple pieces of account complaint data of a same account are correlated with each other, and train the Bayes classification model.

Therefore, in this embodiment of this application, when the Bayes classification model is trained, the training may be performed by using the Bayes classification algorithm according to the differentiation representation value table corresponding to each account, collected account complaint data correlated with each other, and collected account complaint data uncorrelated with each other, to obtain the Bayes classification model.

In an embodiment, specific content of the first correlation is mainly obtained according to actual account complaint experience, and may be generated according to experience of an account complaint processing expert in actual account complaint work, to forcibly determine that the first account complaint data is correlated with the second account complaint data. Therefore, a manner for determining, according to the first correlation, that the first account complaint data is correlated with the second account complaint data may have, when submitted account complaint data is relatively normative, relatively high accuracy of determining account complaint data ownership. However, when submitted account complaint data is relatively not normative, accuracy of determining account complaint data ownership by using the first correlation is not very ideal.

However, the Bayes classification model is generated based on the account complaint data of the massive quantity of accounts, can relatively flexibly process account complaint data in various cases, and can deal with determining of account complaint data ownership when submitted account complaint data is relatively normative and relatively not normative. Therefore, the Bayes classification model may be used to relatively flexibly determine account complaint data ownership, and accuracy of a determining result is relatively high.

Based on this, in this embodiment of this application, account complaint data ownership may be independently determined based on the first correlation or the Bayes classification model; or account complaint data ownership may be determined by using both the first correlation and the Bayes classification model. For example, first whether the first account complaint data is correlated with the second account complaint data is determined based on the first correlation. If the first account complaint data is uncorrelated with the second account complaint data, whether the first account complaint data is correlated with the second account complaint data is determined based on the Bayes classification model. Therefore, a complete picture of account complaint data is considered, increasing accuracy of determining account complaint data ownership.

Figure 10:
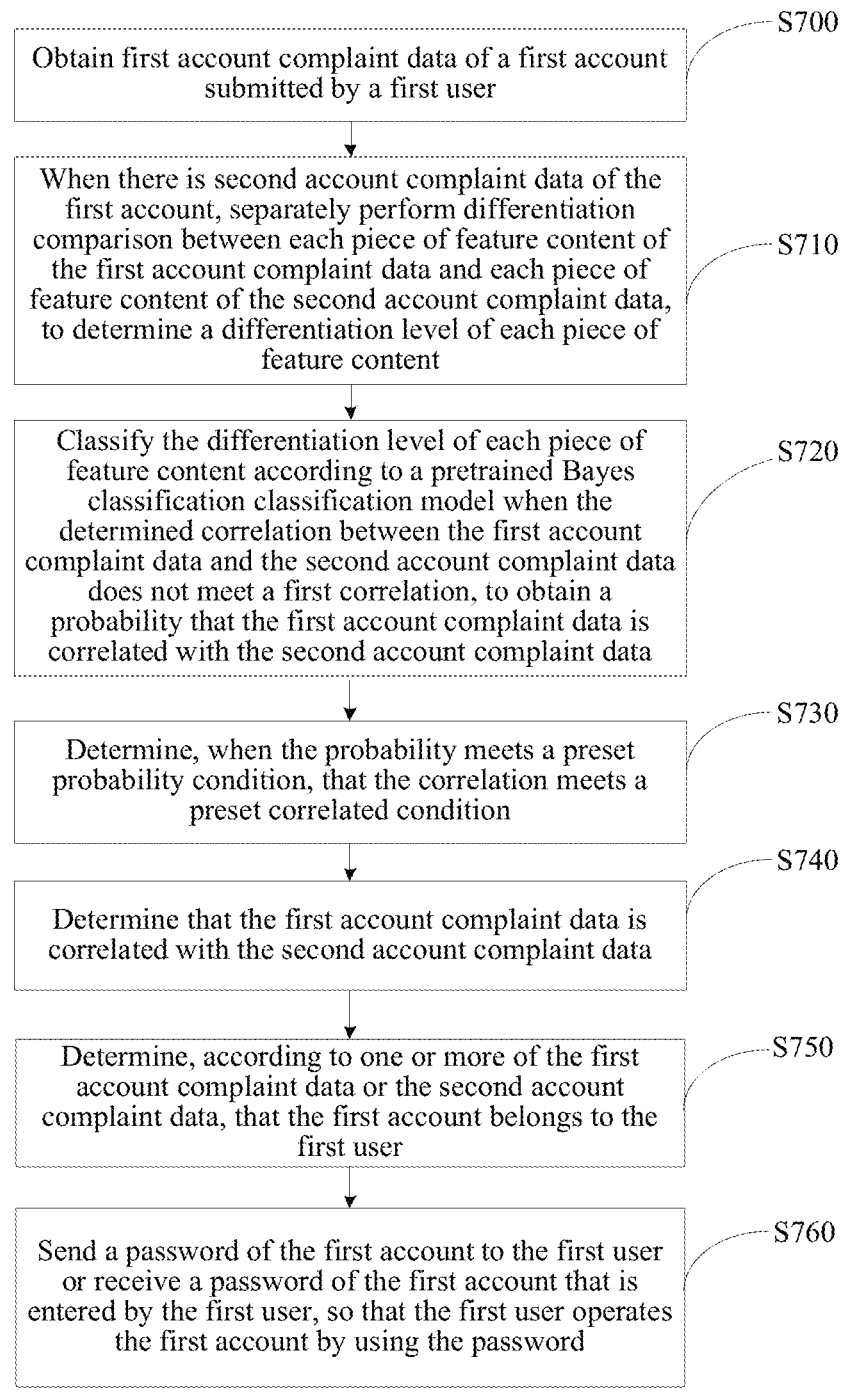
FIG. 10 is still yet another flowchart of an account complaint processing method according to an embodiment of this application.

Correspondingly, FIG. 10 is another flowchart of an account complaint processing method according to an embodiment of this application. Referring to FIG. 10, the method may include the following steps S700, S710, S720, S730, S740, S750, and S760.

In step S700, obtain first account complaint data of a first account submitted by a first user. For example, first data associated with a first account is received from a first user, the first data including at least one piece of first feature content.

In step S710, when there is second account complaint data of the first account, separately perform differentiation comparison between each piece of feature content of the first account complaint data and each piece of feature content of the second account complaint data, to determine a differentiation level of each piece of feature content, where the differentiation level includes: feature content is the same and feature content is similar. For example, second data associated with the first account is received from a second user, the second data including at least one piece of second feature content. Differentiation comparison is performed on each of the at least one piece of the first feature content of the first data and each of the at least one piece of the second feature content of the second data respectively to determine a differentiation level of each of the at least one piece of the first and the second feature content. The at least one differentiation level indicates that the at least one piece of the first feature content and the at least one piece of the second feature content is the same or similar.

In step S720, classify the differentiation level of each piece of feature content according to a pre-trained Bayes classification model when the determined correlation between the first account complaint data and the second account complaint data does not meet a first correlation, to obtain a probability that the first account complaint data is correlated with the second account complaint data, and using the probability to represent the correlation between the first account complaint data and the second account complaint data. That the correlation does not meet a first correlation includes: each piece of feature content is different, or feature content of a preset first type is different, or feature content of a preset second type is not similar. For example, the differentiation level of each of the at least one piece of the first and the second feature content is classified according to a pre-trained Bayes classification model when the correlation between the first data and the second data does not meet a first correlation to obtain a probability that the first data is correlated with the second data.

In an embodiment, that each piece of feature content is different may be: contact information is different, an IP is different, a terminal identifier is different, personal information is different, usage data is different, and a social relationship is different. For example, the correlation does not meet a first correlation when none of the pieces of the first and the second feature content are the same, a preset first type of the first and the second feature content is not the same, or a preset second type of the first and the second feature content is not similar.

That feature content of a preset first type is different may be: contact information is different, or, an IP is different, or, a terminal identifier is different, or, personal information is different. Differentiation levels of usage data and a social relationship may be not considered, or may be considered.

That feature content of a preset second type is not similar may be: usage data is not similar, or, a social relationship is not similar. Differentiation levels of contact information, an IP, a terminal identifier, and personal information may be not considered, or may be considered.

In step S730, determine, when the probability meets a preset probability condition, that the correlation meets a preset correlated condition.

In an embodiment, the preset probability condition may be implemented by setting a target probability. When the probability is not lower than the target probability, it may be considered that the probability meets the preset probability condition.

In step S740, determine that the first data is correlated with the second data.

If the probability does not meet the preset probability condition, it may be considered that the first data is uncorrelated with the second data.

In step S750, determine, according to one or more of the first data or the second data, that the first account belongs to the first user.

In an embodiment, the first account complaint data and the second account complaint data are combined after it is determined that the first account complaint data is correlated with the second account complaint data, to obtain combined account complaint data, so as to determine an account owner of the first account by using the combined account complaint data.

In an embodiment, a manner of combining the first account complaint data and the second account complaint data may be that, for each piece of feature content, parts whose feature content is the same are merged into one part, and parts whose feature content is different are reserved and assembled with same feature content after the merging. For example, for feature content of usage data, a usage password of the first account complaint data is 123456, having a total of six characters, and a usage password of the second account complaint data is 72345, having a total of five characters. Then, four characters thereof are the same; the same 2345 may be merged into one part, and different characters 1, 6, and 7 may be reserved and assembled with 2345 that is one part obtained by means of the merging, to obtain 1 or 7-2345-6.

In an embodiment, the second account complaint data may be historically submitted account complaint data for the first account; the second account complaint data may alternatively be account complaint data generated after historically submitted multiple pieces of account complaint data correlated with each other are combined based on the account complaint processing method provided in this embodiment of this application. For example, after the server historically obtains two pieces of account complaint data for the first account: A and B, and after it is determined that A is correlated with B, A and B may be combined into second account complaint data C; after obtaining first account complaint data D, the server may further determine whether C is correlated with D.

In this embodiment of this application, for multiple pieces of account complaint data of a same account, whether account complaint data is correlated with each other may be pairwise determined. If it is pairwise determined that the account complaint data is correlated with each other, the account complaint data may be combined. Whether the combined account complaint data is correlated with another piece of account complaint data of the same account may be further determined.

In an embodiment, when obtaining the first account complaint data, if the server has determined, by means of a review, a requester of the second account complaint data is an owner of the first account, the server may directly determine that a requester of the first account complaint data is the owner of the first account after determining that the first account complaint data is correlated with the second account complaint data.

For example, one year ago, a user files an account complaint and submits a piece of account complaint data A, and the account complaint data A passes a review, but after one year has elapsed, the user forgot an account password, files an account complaint again, and submits another piece of account complaint data B. If it is determined, by using the account complaint processing method provided in this embodiment of this application, that the account complaint data A is correlated with the account complaint data B, it may be considered that the requester of the account complaint data B is the account owner, and may have a permission to change the account password, avoiding a subsequent process of a system review or a customer service review, and effectively and accurately implementing determining of account ownership.

It can be seen that, in this embodiment of this application, after it is determined that the first account complaint data is correlated with the second account complaint data, if it has been historically determined, based on the second account complaint data, that the requester of the second account complaint data is the owner of the first account, it is determined that the requester of the first account complaint data is also the owner of the first account.

In an embodiment, if the owner of the first account is not determined based on the second account complaint data, after it is determined that the first account complaint data is correlated with the second account complaint data, the first account complaint data may be combine with the second account complaint data, to obtain combined account complaint data, so as to determine the account owner of the first account by using the combined account complaint data.

In step S760, send a first password of the first account to the first user or receive a second password of the first account that is entered by the first user, so that the first user accesses and operates the first account by using the first or the second password.

According to the account complaint processing method provided in this embodiment of this application, account complaint data correlated with each other may be determined, account complaint data belonging to a same natural person may be determined in multiple pieces of account complaint data of a same account, so as to help to determine account ownership, and increase accuracy of a result of determining the account ownership.

The following describes a server provided in an embodiment of this application. The server described in the following may be cross-referenced with the account complaint processing method described in the foregoing from the perspective of the server.

Figure 11:
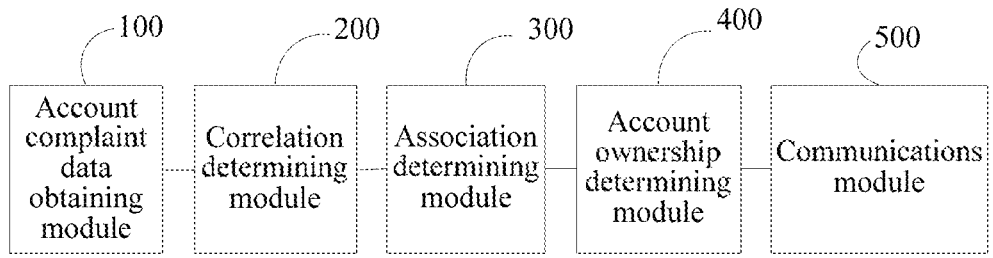
FIG. 11 is a structural block diagram of a server according to an embodiment of this application.

FIG. 11 is a structural block diagram of a server according to an embodiment of this application. Referring to FIG. 11, the server may include:

an account complaint data obtaining module 100, configured to obtain first account complaint data of a first account submitted by a first user, account complaint data including at least one piece of feature content;

a correlation determining module 200, configured to separately compare, when there is second account complaint data of the first account, each piece of feature content of the first account complaint data with each piece of feature content of the second account complaint data, to determine a correlation between the first account complaint data and the second account complaint data;

an association determining module 300, configured to determine, when the correlation meets a preset correlated condition, that the first account complaint data is correlated with the second account complaint data;

an account ownership determining module 400, configured to determine, according to one or more of the first account complaint data or the second account complaint data, that the first account belongs to the first user; and a communications module 500, configured to: send a password of the first account to the first user or receive a password of the first account that is entered by the first user, so that the first user operates the first account by using the password.

The correlation between the first account complaint data and the second account complaint data may indicate a possibility that the first account complaint data is correlated with the second account complaint data.

That the correlation meets a preset correlated condition may include: the possibility is not lower than a corresponding possibility that multiple pieces of account complaint data of a same account are correlated with each other.

Figure 12:
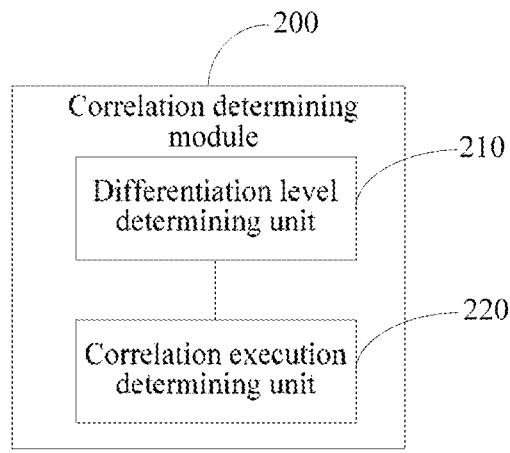
FIG. 12 is a structural block diagram of a correlation determining module according to an embodiment of this application.

In an embodiment, FIG. 12 shows a structure of a correlation determining module 200 according to an embodiment of this application. Referring to FIG. 12, the correlation determining module 200 may include:

a differentiation level determining unit 210, configured to separately perform differentiation comparison between each piece of feature content of first account complaint data and each piece of feature content of second account complaint data, to determine a differentiation level of each piece of feature content; and a correlation determining execution unit 220, configured to determine a correlation between the first account complaint data and the second account complaint data according to the differentiation level of each piece of feature content, where the correlation indicates a possibility that the first account complaint data is correlated with the second account complaint data.

Figure 13:
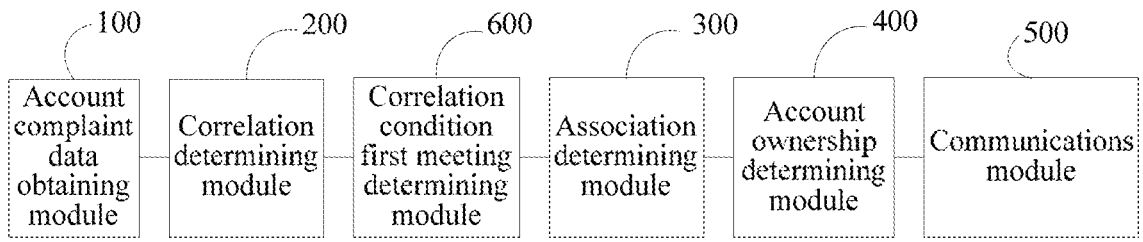
FIG. 13 is another structural block diagram of a server according to an embodiment of this application.

In an embodiment, the differentiation level may include: feature content is the same and feature content is similar. Based on FIG. 12, correspondingly, FIG. 13 is another structural block diagram of a server according to an embodiment of this application. With reference to FIG. 11 and FIG. 13, the server may further include:

a correlation condition first meeting determining module 600, configured to determine, when the determined correlation between the first account complaint data and the second account complaint data meets a first correlation, that the correlation meets a preset correlated condition.

That the correlation meets a first correlation includes: each piece of feature content is the same; or a part of feature content is the same and another part of feature content is similar, a type of feature content of the same feature content meets a preset first type, and a type of feature content of the similar feature content meets a preset second type.

Figure 14:
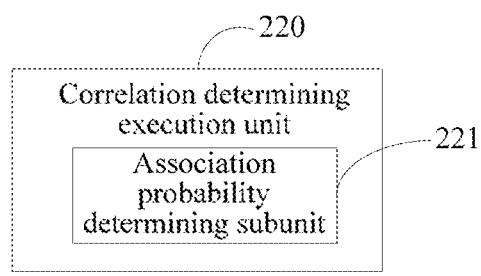
FIG. 14 is a structural block diagram of a correlation determining execution unit according to an embodiment of this application.

In an embodiment, FIG. 14 shows a structure of a correlation determining execution unit 220 according to an embodiment of this application. Referring to FIG. 14, the correlation determining execution unit 220 may include:

an association probability determining subunit 221, configured to: classify a differentiation level of each piece of feature content according to a pre-trained Bayes classification model, to obtain a probability that first account complaint data is correlated with second account complaint data, and use the probability to represent the correlation.

Figure 15:
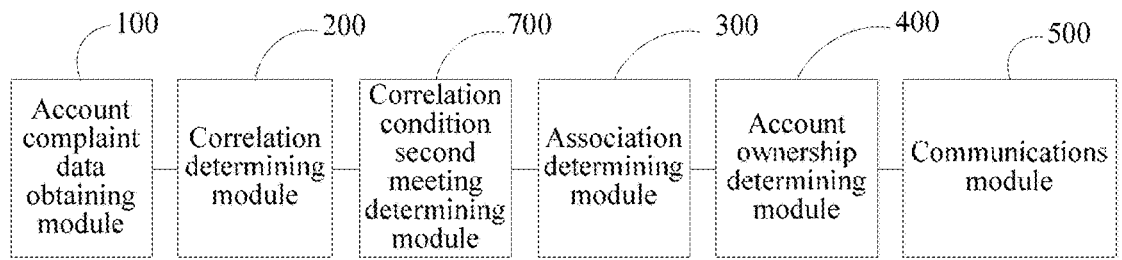
FIG. 15 is still another structural block diagram of a server according to an embodiment of this application.

Correspondingly, based on FIG. 14, FIG. 15 is still another structural block diagram of a server according to an embodiment of this application. With reference to FIG. 11 and FIG. 15, the server may further include:

a correlation condition second meeting determining module 700, configured to determine, when the probability meets a preset probability condition, that the correlation meets a preset correlated condition.

Figure 16:
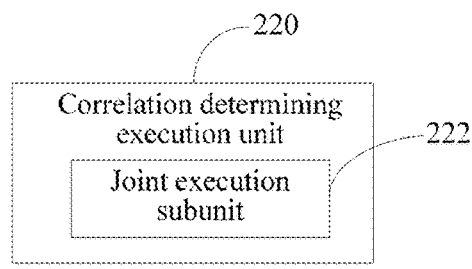
FIG. 16 is another structural block diagram of a correlation determining execution unit according to an embodiment of this application.

In an embodiment, the differentiation level includes: feature content is the same and feature content is similar. Correspondingly, FIG. 16 shows another optional structure of a correlation determining execution unit 220 according to an embodiment of this application. Referring to FIG. 16, the correlation determining execution unit 220 may include:

a joint execution subunit 222, configured to: classify a differentiation level of each piece of feature content according to a pre-trained Bayes classification model when a determined correlation between first account complaint data and second account complaint data does not meet a first correlation, to obtain a probability that the first account complaint data is correlated with the second account complaint data, and use the probability to represent the correlation.

That the correlation does not meet a first correlation includes: each piece of feature content is different, or feature content of a preset first type is different, or feature content of a preset second type is not similar.

Correspondingly, based on FIG. 16, in this embodiment of this application, when the probability meets a preset probability condition, it may be determined that the correlation meets a preset correlated condition.

Figure 17:
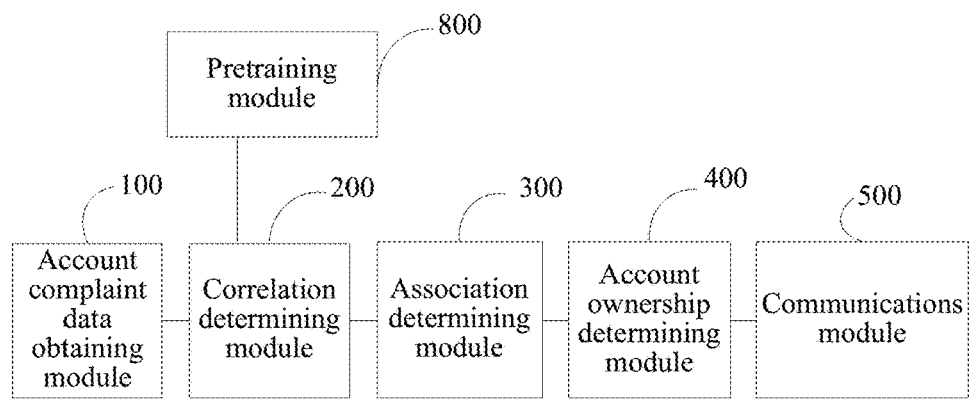
FIG. 17 is still another structural block diagram of a server according to an embodiment of this application.

In an embodiment, FIG. 17 is still another structural block diagram of a server according to an embodiment of this application. FIG. 17 shows a process of pre-training a Bayes classification model. With reference to FIG. 11 and FIG. 17, the server may further include:

a pre-training module 800, configured to: collect account complaint data of multiple accounts, where one account corresponds to multiple pieces of account complaint data; separately compare each piece of feature content of each piece of account complaint data for each account, to determine a differentiation level of each piece of feature content of account complaint data of each account; determine a correlation between account complaint data of the accounts by using the differentiation level of each piece of feature content of the account complaint data of each account, where the correlation includes a first correlation and a second correlation, the first correlation indicates that each piece of feature content is the same, or one part of feature content is the same, another part of feature content is similar, a type of feature content whose feature content is the same meets a preset first type, a type of feature content whose feature content is similar meets a preset second type, the second correlation indicates that each piece of feature content in multiple pieces of account complaint data of a same account is similar; and perform training by using a Bayes classification algorithm according to the correlation between the account complaint data of all the accounts, collected account complaint data correlated with each other, and collected account complaint data uncorrelated with each other, to obtain a Bayes classification model.

In an embodiment, when determining the correlation between the account complaint data of the accounts by using the differentiation level of each piece of the feature content of the account complaint data of each account, the pre-training module 800 may be specifically configured to:

for each account, define a differentiation representation value of each piece of feature content of account complaint data according to a differentiation level of each piece of feature content of the account complaint data, to obtain a corresponding differentiation representation value group of the account complaint data, where the differentiation representation value includes a first value that indicates that feature content is the same and a second value that indicates that feature content is similar, and the first value is different from the second value; and for each account, create a differentiation representation value table corresponding to each account according to the corresponding differentiation representation value group of the account complaint data, and use the differentiation representation value table to represent the correlation between the account complaint data of the accounts.

Correspondingly, when performing training by using the Bayes classification algorithm according to the correlation between the account complaint data of all the accounts, collected account complaint data correlated with each other and collected account complaint data uncorrelated with each other, to obtain a Bayes classification model, the pre-training module 800 may be specifically configured to:

perform training by using the Bayes classification algorithm according to the differentiation representation value table corresponding to each account, the collected account complaint data correlated with each other, and the collected account complaint data uncorrelated with each other, to obtain the Bayes classification model.

In an embodiment, the account ownership determining module 400 is configured to determine that the first account belongs to the first user after it is determined that the first account complaint data is correlated with the second account complaint data, if it has been determined, based on the second account complaint data, that the first account belongs to the second user submitting the second account complaint data.

In an embodiment, the account ownership determining module 400 is further configured to: combine the first account complaint data and the second account complaint data after it is determined that the first account complaint data is correlated with the second account complaint data, to obtain combined account complaint data, and determine, by using the combined account complaint data, that the first account belongs to the first user.

The server provided in this embodiment of this application can determine account complaint data correlated with each other, and provide a possibility to help to determine account ownership and increase accuracy of a result of determining the account ownership.

Figure 18:
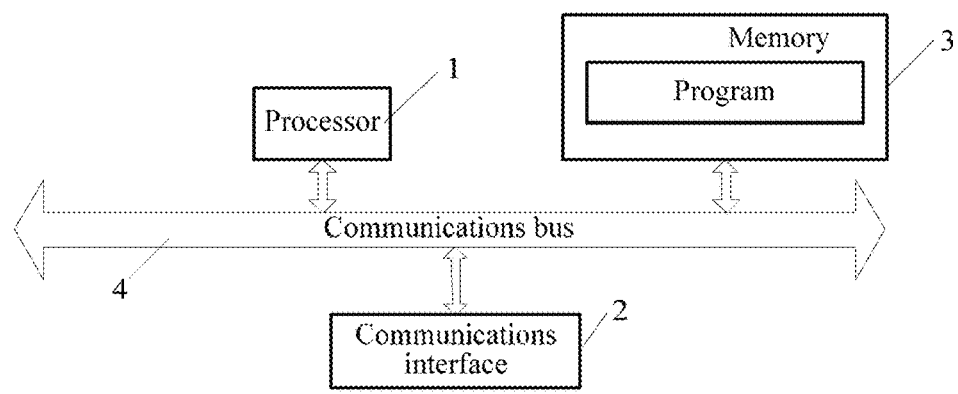
FIG. 18 is a structural block diagram of hardware of a server according to an embodiment of this application.

A hardware structure of the server provided in this embodiment of this application may be shown in FIG. 18, and includes: a processor or processing circuitry 1, a communications interface 2, a memory 3, and a communications bus 4.

The processor 1, the communications interface 2, and the memory 3 communicate with each other by using the communications bus 4.

The communications interface 2 may be an interface of a communications module, such as an interface of a GSM module;

the processor 1 is configured to perform a program;

the memory 3 is configured to store the program; and the program may include program code, and the program code includes a computer operating instruction.

The processor 1 may be a central processing unit (CPU) or an application specific integrated circuit (ASIC) or may be configured as one or more integrated circuits for implementing the embodiments of the present application.

The memory 3 may include a high-speed RAM memory, or may include a non-volatile memory, such as at least one magnetic disk memory.

The program may be specifically used for:

obtaining first account complaint data of a first account submitted by a first user, account complaint data including at least one piece of feature content;

separately comparing, when there is second account complaint data of the first account, each piece of feature content of the first account complaint data with each piece of feature content of the second account complaint data, to determine a correlation between the first account complaint data and the second account complaint data;

determining, when the correlation meets a preset correlated condition, that the first account complaint data is correlated with the second account complaint data; and determining, according to one or more of the first account complaint data or the second account complaint data, that the first account belongs to the first user; and the communications interface is configured to: when it is determined that the first account belongs to the first user, send a password of the first account to the first user or receive a password of the first account that is entered by the first user, so that the first user operates the first account by using the password.

An embodiment of this application further provides an account complaint processing system. A structure of the system may be shown in FIG. 1, and includes: a server and at least one terminal, where the terminal is configured to obtain first account complaint data of a first account submitted by a first user, where account complaint data includes at least one piece of feature content; and the server is configured to: obtain first account complaint data of a first account, where account complaint data includes at least one piece of feature content; compare, when there is second account complaint data of the first account, each piece of feature content of the first account complaint data with each piece of feature content of the second account complaint data, to determine a correlation between the first account complaint data and the second account complaint data; determine, when the correlation meets a preset correlated condition, that the first account complaint data is correlated with the second account complaint data; determine, according to one or more of the first account complaint data and the second account complaint data, that the first account belongs to the first user; and when determining that the first account belongs to the first user, send a password of the first account to the first user or receive a password of the first account that is entered by the first user, so that the first user operates the first account by using the password.

It is noted that the embodiments in this specification are all described in a progressive manner. Description of each of the embodiments focuses on differences from other embodiments, and reference may be made to each other for the same or similar parts among respective embodiments. The apparatus embodiments are substantially similar to the method embodiments and therefore are only briefly described, and reference may be made to the method embodiments for the associated part.

Persons skilled in the art may further realize that, in combination with the embodiments herein, units and algorithm, steps of each example described can be implemented with electronic hardware, computer software, or the combination thereof. In order to clearly describe the interchangeability between the hardware and the software, compositions and steps of each example have been generally described according to functions in the foregoing descriptions. Whether the functions are executed in a mode of hardware or software depends on particular applications and design constraint conditions of the technical solutions. Persons skilled in the art can use different methods to implement the described functions for each particular application, but it should not be considered that the implementation goes beyond the scope of this application.

In combination with the embodiments herein, steps of the method or algorithm described may be directly implemented using hardware, a software module executed by a processor, or the combination thereof. The software module may be placed in a random access memory (RAM), a memory, a read-only memory (ROM), an electrically programmable ROM (EPROM), an electrically erasable programmable ROM (EEPROM), a register, a hard disk, a removable magnetic disk, a CD-ROM, or any storage medium of other forms in the technical field.

The above description of the disclosed embodiments enables persons skilled in the art to implement or use this application. Various modifications to these embodiments are obvious to persons skilled in the art; the general principles defined in this document may be implemented in other embodiments without departing from the spirit and scope of this application. Therefore, this application is not limited to these embodiments illustrated in the present disclosure, but needs to conform to the broadest scope consistent with the principles and novel features disclosed in this document.

What is claimed is:

1. An information processing method, comprising:
receiving first data associated with a first account from a first user, the first data including at least one piece of first feature content;
receiving second data associated with the first account from a second user, the second data including at least one piece of second feature content;
comparing the at least one piece of the first feature content of the first data with the at least one piece of the second feature content of the second data;
determine a correlation between the first data and the second data based on the comparison between the at least one piece of the first feature content and the at least one piece of the second feature content;
determining, when the correlation meets a preset correlated condition, that the first data is correlated with the second data;
determining, by processing circuitry of a server, when the first data is determined to be correlated with the second data, that the first account belongs to the first user; and
sending a first password of the first account to the first user or receiving a second password of the first account that is entered by the first user, wherein
the first user accesses the first account by using the first or the second password.

2. The information processing method according to claim 1, wherein the comparing comprises:
performing differentiation comparison on each of the at least one piece of the first feature content of the first data and each of the at least one piece of the second feature content of the second data respectively to determine a differentiation level of each of the at least one piece of the first and the second feature content; and
determining the correlation between the first data and the second data according to the differentiation level of each of the at least one piece of the first and the second feature content.

3. The information processing method according to claim 2, wherein the at least one differentiation level indicates that the at least one piece of the first feature content and the at least one piece of the second feature content is the same or similar, and the preset correlated condition is that each of the at least one piece of the first feature content is the same as one of the at least piece of the second feature content, or
one part of the first feature content and one part of the second feature content of a preset first type is the same, another part of the first feature content and another part of the second feature content of a preset second type is similar.

4. The information processing method according to claim 2, wherein the determining the correlation between the first data and the second data comprises:
classifying the differentiation level of each of the at least one piece of the first and the second feature content according to a pre-trained Bayes classification model to obtain a probability that the first data is correlated with the second data; and
determining, when the probability meets a preset probability condition, that the correlation meets the preset correlated condition.

5. The information processing method according to claim 2, wherein
the at least one differentiation level indicates that the at least one piece of the first feature content and the at least one piece of the second feature content is the same or similar; and the determining the correlation includes classifying the differentiation level of each of the at least one piece of the first and the second feature content according to a pre-trained Bayes classification model when the correlation between the first data and the second data does not meet a first correlation to obtain a probability that the first data is correlated with the second data; and determining that the correlation does not meet the preset correlated condition, and the correlation does not meet a first correlation when
none of the pieces of the first and the second feature content are the same,
a preset first type of the first and the second feature content is not the same, or
a preset second type of the first and the second feature content is not similar.

6. The information processing method according to claim 4, further comprising:
collecting account data of multiple accounts, wherein one account of the multiple accounts corresponds to more than one piece of account data associated with the account;
comparing each piece of feature content of each piece of account data for each account of the multiple accounts to determine a differentiation level of each piece of the feature content of the account data of each account of the multiple accounts;
determining a correlation between account data of the multiple accounts by using the differentiation level of each piece of the feature content of the account data of each account of the multiple accounts, wherein the correlation includes a first correlation and a second correlation, the first correlation indicates that each piece of the feature content of the account data of each account of the multiple accounts is the same, or one part of the feature content of the account data of each account of the multiple accounts of a preset first type is the same, another part of the feature content of the account data of each account of the multiple accounts of a preset second type is similar; and
performing training by using a Bayes classification algorithm according to the correlation between the account data of each account of the multiple accounts, collected account data correlated with each other, and collected account data uncorrelated with each other, to obtain the Bayes classification model.

7. The information processing method according to claim 6, wherein the determining the correlation between the account data of the multiple accounts by using the differentiation level of each piece of the feature content of the account data of each account comprises:
for each account, defining a differentiation representation value of each piece of the feature content of the account data according to the differentiation level of each piece of feature content of the account data to obtain a corresponding differentiation representation value group of the account data, wherein the differentiation representation value includes a first value indicating that each piece of the feature content of the account data is the same and a second value indicating that each piece of the feature content of the account data is similar, and the first value is different from the second value; and
for each account, creating a differentiation representation value table corresponding to each account according to the corresponding differentiation representation value group of the account data, and using the differentiation representation value table to represent the correlation between the account data of the multiple accounts.

8. The information processing method according to claim 7, wherein the performing training by using a Bayes classification algorithm comprises:
performing training by using the Bayes classification algorithm according to the differentiation representation value table corresponding to each account of the multiple accounts, the collected account data correlated with each other, and the collected account data uncorrelated with each other, to obtain the Bayes classification model.

9. The information processing method according to claim 1, wherein the determining, when the first data is determined to be correlated with the second data, that the first account belongs to the first user comprises:
determining that the first account belongs to the first user when the first data is determined to be correlated with the second data, which indicates that the first user and the second user are the same; or
combining the first data and the second data, when the first data is determined that the first data is correlated with the second data, to obtain combined data; and
determining, based on the combined data, that the first account belongs to the first user.

10. A server, comprising:
processing circuitry configured to
receive first data associated with a first account from a first user, the first data including at least one piece of first feature content;
receive second data associated with the first account from a second user, the second data including at least one piece of second feature content;
compare the at least one piece of the first feature content of the first data with the at least one piece of the second feature content of the second data;
determine a correlation between the first data and the second data based on the comparison between the at least one piece of the first feature content and the at least one piece of the second feature content;
determine, when the correlation meets a preset correlated condition, that the first data is correlated with the second data;
determine, when the first data is determined to be correlated with the second data, that the first account belongs to the first user; and
send a first password of the first account to the first user or receive a second password of the first account that is entered by the first user, wherein
the first user accesses the first account by using the first or the second password.

11. The server according to claim 10, wherein the processing circuitry is further configured to
perform differentiation comparison on each of the at least one piece of the first feature content of the first data and each of the at least one piece of the second feature content of the second data respectively to determine a differentiation level of each of the at least one piece of the first and the second feature content; and
determine the correlation between the first data and the second data according to the differentiation level of each of the at least one piece of the first and the second feature content.

12. The server according to claim 11, wherein the at least one differentiation level indicates that the at least one piece of the first feature content and the at least one piece of the second feature content is the same or similar, and the preset correlated condition is that each of the at least one piece of the first feature content is the same as one of the at least piece of the second feature content, or
one part of the first feature content and one part of the second feature content of a preset first type is the same, another part of the first feature content and another part of the second feature content of a preset second type is similar.

13. The server according to claim 11, wherein the processing circuitry is further configured to
classify the differentiation level of each of the at least one piece of the first and the second feature content according to a pre-trained Bayes classification model to obtain a probability that the first data is correlated with the second data; and
determine, when the probability meets a preset probability condition, that the correlation meets the preset correlated condition.

14. The server according to claim 11, wherein the at least one differentiation level indicates that the at least one piece of the first feature content and the at least one piece of the second feature content is the same or similar and the processing circuitry is further configured to
classify the differentiation level of each of the at least one piece of the first and the second feature content according to a pre-trained Bayes classification model when the correlation between the first data and the second data does not meet a first correlation to obtain a probability that the first data is correlated with the second data; and
determine that the correlation does not meet the preset correlated condition, and the correlation does not meet a first correlation when
none of the pieces of the first and the second feature content are the same,
a preset first type of the first and the second feature content is not the same, or
a preset second type of the first and the second feature content is not similar.

15. The server according to claim 10, wherein the processing circuitry is further configured to determine that the first account belongs to the first user when the first data is determined to be correlated with the second data, which indicates that the first user and the second user are the same; or
combine the first data and the second data, when the first data is determined that the first data is correlated with the second data, to obtain combined data; and
determine, based on the combined data, that the first account belongs to the first user.

16. A non-transitory computer-readable medium storing a program executable by a processor to perform:
receiving first data associated with a first account from a first user, the first data including at least one piece of first feature content;
receiving second data associated with the first account from a second user, the second data including at least one piece of second feature content;
comparing the at least one piece of the first feature content of the first data with the at least one piece of the second feature content of the second data;
determine a correlation between the first data and the second data based on the comparison between the at least one piece of the first feature content and the at least one piece of the second feature content;
determining, when the correlation meets a preset correlated condition, that the first data is correlated with the second data;
determining, by processing circuitry of a server, when the first data is determined to be correlated with the second data, that the first account belongs to the first user; and
sending a first password of the first account to the first user or receiving a second password of the first account that is entered by the first user, wherein
the first user accesses the first account by using the first or the second password.

17. The non-transitory computer-readable medium according to claim 16, wherein the comparing comprises:
performing differentiation comparison on each of the at least one piece of the first feature content of the first data and each of the at least one piece of the second feature content of the second data respectively to determine a differentiation level of each of the at least one piece of the first and the second feature content; and
determining the correlation between the first data and the second data according to the differentiation level of each of the at least one piece of the first and the second feature content.

18. The non-transitory computer-readable medium according to claim 16, wherein the at least one differentiation level indicates that the at least one piece of the first feature content and the at least one piece of the second feature content is the same or similar, and the preset correlated condition is that each of the at least one piece of the first feature content is the same as one of the at least piece of the second feature content, or
one part of the first feature content and one part of the second feature content of a preset first type is the same, another part of the first feature content and another part of the second feature content of a preset second type is similar.

19. The non-transitory computer-readable medium according to claim 16, wherein the determining the correlation between the first data and the second data comprises:
classifying the differentiation level of each of the at least one piece of the first and the second feature content according to a pre-trained Bayes classification model to obtain a probability that the first data is correlated with the second data; and
determining, when the probability meets a preset probability condition, that the correlation meets the preset correlated condition.

20. The non-transitory computer-readable medium according to claim 16, wherein
the at least one differentiation level indicates that the at least one piece of the first feature content and the at least one piece of the second feature content is the same or similar and the determining the correlation includes
classifying the differentiation level of each of the at least one piece of the first and the second feature content according to a pre-trained Bayes classification model when the correlation between the first data and the second data does not meet a first correlation to obtain a probability that the first data is correlated with the second data; and
determining that the correlation does not meet the preset correlated condition, and the correlation does not meet a first correlation when
none of the pieces of the first and the second feature content are the same,
a preset first type of the first and the second feature content is not the same, or a preset second type of the first and the second feature content is not similar.

\* \* \* \* \*